United States Patent
Maerki et al.

(12)

(10) Patent No.: US 10,434,508 B2
(45) Date of Patent: Oct. 8, 2019

(54) CAPSULE FOR RAPID MOLECULAR QUANTIFICATION OF A FLUID SAMPLE SUCH AS WHOLE BLOOD

(71) Applicant: Abionic SA, Epalinges (CH)

(72) Inventors: Iwan Maerki, Yverdon-les-Bains (CH); Lauriane Carrere, Bussigny (CH); Nicolas Durand, Blonay (CH)

(73) Assignee: Abionic SA, Epalinges (CH)

( * ) Notice: Subject to any disclaimer, the term of this patent is extended or adjusted under 35 U.S.C. 154(b) by 186 days.

(21) Appl. No.: 15/321,199

(22) PCT Filed: Jun. 23, 2015

(86) PCT No.: PCT/IB2015/054706
§ 371 (c)(1),
(2) Date: Dec. 22, 2016

(87) PCT Pub. No.: WO2016/001795
PCT Pub. Date: Jan. 7, 2016

(65) Prior Publication Data
US 2017/0197210 A1    Jul. 13, 2017

(30) Foreign Application Priority Data
Jul. 3, 2014   (WO) .................. PCT/IB2014/062818

(51) Int. Cl.
*B01L 3/00*   (2006.01)
*G01N 33/543*   (2006.01)
(Continued)

(52) U.S. Cl.
CPC ........ *B01L 3/502* (2013.01); *G01N 33/54386* (2013.01); *B01L 2200/025* (2013.01);
(Continued)

(58) Field of Classification Search
CPC ..... B01L 2300/0636; B01L 2300/0896; B01L 2300/021; B01L 2300/0681; B01L 3/502;
(Continued)

(56) References Cited

U.S. PATENT DOCUMENTS 6,069,014 A   5/2000 Schrier et al.
8,938,103 B2   1/2015 Durand et al.
(Continued)

FOREIGN PATENT DOCUMENTS

CH   01824/09   2/1936
EP   2070594 A1   6/2009
(Continued)

OTHER PUBLICATIONS

International Search Report of PCT/IB2015/054706 dated Oct. 7, 2015.
(Continued)

*Primary Examiner* — Lyle Alexander
*Assistant Examiner* — Bryan Kilpatrick
(74) *Attorney, Agent, or Firm* — Andre Roland S.A.; Nikolaus Schibli

(57) ABSTRACT

A capsule (100) comprising a housing (110) in which are disposed nanofluidic biosensors (120), a fluid connecting element (140), a filter (150) and a cover (160) is described. The capsule (100) allows the analysis of a fluid sample (300) that would be deposited in the capsule system (100) by a pipette (400). The fluid sample (300) is filtered when passing through a filter (150), then transferred by a fluid connecting element (140) to the inlets of one or several nanofluidic biosensors (120). The capsule system (100) is disposed on an external support (200), and finally an optical or an electrical measurement unit (500) is used to measure the molecular interactions in the nanofluidic biosensors.

14 Claims, 5 Drawing Sheets

(51) Int. Cl.
  *B82Y 15/00* (2011.01)
  *B82Y 30/00* (2011.01)
  *B82Y 35/00* (2011.01)

(52) U.S. Cl.
  CPC ... *B01L 2300/021* (2013.01); *B01L 2300/043* (2013.01); *B01L 2300/0654* (2013.01); *B01L 2300/0681* (2013.01); *B01L 2300/0816* (2013.01); *B01L 2300/0864* (2013.01); *B01L 2300/126* (2013.01); *B01L 2400/0406* (2013.01); *B82Y 15/00* (2013.01); *B82Y 30/00* (2013.01); *B82Y 35/00* (2013.01)

(58) Field of Classification Search
  CPC .. G01N 33/54386; B82Y 35/00; B82Y 15/00; B82Y 30/00
  See application file for complete search history.

(56) References Cited

U.S. PATENT DOCUMENTS

| | | |
|---|---|---|
| 9,452,927 B2 | 9/2016 | Durand et al. |
| 9,547,004 B2 | 1/2017 | Durand et al. |
| 2004/0087033 A1* | 5/2004 | Schembri ............. B01J 19/0046 506/39 |
| 2005/0266582 A1 | 12/2005 | Modlin |
| 2009/0120865 A1 | 5/2009 | Chung et al. |
| 2010/0144020 A1 | 6/2010 | Kim et al. |
| 2014/0176939 A1 | 6/2014 | Shah et al. |
| 2017/0197210 A1 | 7/2017 | Maerki et al. |

FOREIGN PATENT DOCUMENTS

| | | |
|---|---|---|
| EP | 2281631 A1 | 2/2011 |
| JP | H9-257748 | 10/1997 |
| JP | 2013-076711 | 4/2013 |
| WO | WO 2006/080438 | 6/2008 |
| WO | WO 2009106331 A2 | 9/2009 |
| WO | WO PCT/IB2010/050867 | 3/2010 |
| WO | WO 2011/064701 | 6/2011 |
| WO | WO 2011/107916 | 9/2011 |
| WO | WO 2011107916 A1 | 9/2011 |
| WO | WO-2012120387 A1 * | 9/2012 ........ B01L 3/502746 |
| WO | WO 2012120387 A1 | 9/2012 |
| WO | WO 2012/120387 | 12/2012 |
| WO | WO PCT/IB2013/060935 | 12/2013 |

OTHER PUBLICATIONS

Written Opinion of the International Search Authority dated Oct. 7, 2015.
Chinese Office Action of Jul. 4, 2018 for the counterpart CN patent application with the Serial No. 201580036327.7 and English translation thereof.
European Office Action (Communication 94(3)) of Aug. 9, 2018 for the counterpart EPO application witn the Serial No. 15747539.3.
Meng et al., "A degassing plate with hydrophobic bubble capture and distributed venting for microfluidic devices." Journal of Micromechanics and Microengineering 16.2 (2006): 419.
"A degassing plate with hydrophobic bubble capture and distributed venting for microfluidic devices", Journal of Micromechanics & Microengineering, Dennis Deshen Meng, vol. 16, No. 2, Jan. 19, 2006, pp. 419-424.
Japanese Patent Application 2017-520030 Notice of Reasons for Rejection dated May 28, 2019.

* cited by examiner

CAPSULE FOR RAPID MOLECULAR QUANTIFICATION OF A FLUID SAMPLE SUCH AS WHOLE BLOOD

CROSS REFERENCE TO RELATED APPLICATIONS

The present application is a U.S. national stage application of PCT/IB2015/054706 filed on Jun. 23, 2015 designating the United States, and claims foreign priority to International patent application PCT/IB2014/062818 filed on Jul. 3, 2014, the contents of both documents being herewith incorporated by reference in their entirety.

FIELD OF INVENTION

The present invention relates to a capsule which is particularly efficient for the direct handling and measurement of a fluid sample.

BACKGROUND OF THE INVENTION

Point-of-Care medical in vitro diagnostic (IVD) tests are defined as diagnostic tests realized at the time of care with biological samples outside of their normal environment. Applications include quantification of the presence of biomolecules in a fluid sample solution. A majority of the current point-of-care IVD tests are intended for medical applications. In the scope of this invention, capsule systems are used to handle the patient fluid sample, to treat it and to transfer it to nanofluidic biosensors for quantification of the presence of biomolecules in the solution.

Nanofluidic biosensors are defined as fluidic systems with nanometer-sized confinements and/or lateral apertures.

Several patent applications such as Swiss patent application CH 01824/09, PCT application IB2010/050867, PCT application IB2012/050527 and PCT application IB2013/060935 discloses nanofluidic biosensors with lateral apertures for the detection of biomolecular interactions. They also disclose their use with optical systems, the method to decrease the incubation time and to increase the sensitivity of the described biosensors.

Current practices for the detection of specific biomolecules can be divided in two categories: (a) the labeled techniques and (b) the label-free techniques.

Among the labeled techniques, the widely used are fluorescence, colorimetry, radioactivity, phosphorescence, bioluminescence and chemiluminescence. Functionalized magnetic beads can also be considered as labeling techniques. Labeled techniques advantages are the sensitivity in comparison to label-free methods and the molecular recognition due to specific labeling.

Among the label-free techniques, the widely used are electrochemical biosensors, referring to amperometric, capacitive, conductometric or impedimetric sensors, which have the advantage of being rapid and inexpensive. They measure the change in electrical properties of electrode structures as biomolecules become entrapped or immobilized onto or near the electrode, but all these concepts lack molecular specific contrast, sensitivity and reliability.

Enzyme linked immunosorbent assay (ELISA) is an important biochemical technique mainly used to detect the presence of soluble biomolecules in serum, and thus is widely used as diagnostic tool in medicine and quality control check in various industries. ELISA analysis are however expensive, require relatively large amounts of solution and are time consuming.

The other important technologies for biomolecular diagnostics are Western and Northern blots, protein electrophoresis and polymerase chain reaction (PCR). However, these methods require highly concentrated analytes and do not allow high throughput samples testing.

Objectives

It is an object of this invention to improve usability of rapid quantitative diagnostic tests.

Still another object of the invention is to directly assess a fluid sample containing big components which have to be extracted from the fluid before the measurement.

Still another object of the invention is to enhance the identification of the capsule.

SUMMARY OF THE INVENTION

This invention is based on the discovery that the combination of a filter, a fluid connecting element and one or several biosensors is allowing the direct use of whole blood or fluid sample containing big components, avoiding pretreatment steps such as centrifugation.

This invention is also based on the discovery that integrating an identification module in a capsule design allows a robust user manipulation in the sense that the capsule is informing the reader system about its content and thus, avoid systematic software update in case of new tests.

The subsystem composed of the filter (150) and the fluid connecting element (140) may be made of fibers (paper filters) or porous material.

In the present text the term "nanofluidic biosensors" has to be understood as any fluidic system which contains one or several channels with at least one dimension below 10 um.

The invention therefore relates to a capsule and use as defined in the claims.

Some non-limiting examples of the invention are presented in the following chapters. Some of those examples are illustrated.

DETAILED DESCRIPTION OF THE INVENTION

As used herein, the term "fluid sample" is intended to be a generic term, which includes for example (but not limited to) liquid containing proteins such as antibodies or cytokines, peptides, nucleic acids, lipid molecules, polysaccharides and virus.

As used herein, the terms "nanofluidic biosensor" is intended to be a generic term, which means microfabricated sensor containing at least one well-defined internal channel having at least one dimension below 10 μm.

As used herein, the term "capsule" is intended to be a generic term, which includes for example (but not limited to) a structure maintaining together the nanofluidic biosensors and all the others components. The capsule may have an upper part that may be folded in order to close the capsule.

As used herein, the term "cover" is intended to be a generic term, which includes for example (but not limited to) a part of the capsule system defining the aperture where the fluid sample will be deposited.

As used herein, the term "fluid connecting element" is intended to be a generic term, which includes for example (but not limited to) a material that absorbs liquids and sample fluids, and distributes them to nanofluidic biosensors that may be in contact with this material.

As used herein, the term "filter" is intended to be a generic term, which includes for example (but not limited to) a material that mechanically filters liquids and sample fluids, in order to extract large molecules and to distribute liquids containing small molecules to fluid connecting element.

As used herein, the term "identification module" is intended to be a generic term, which includes for example (but not limited to) a system that allows the measuring unit to identify the content of the capsule or of the nanofluidic biosensors. For example, it can be a RFID tag or a simple barcode printed on the capsule housing 110.

Figure 1A:
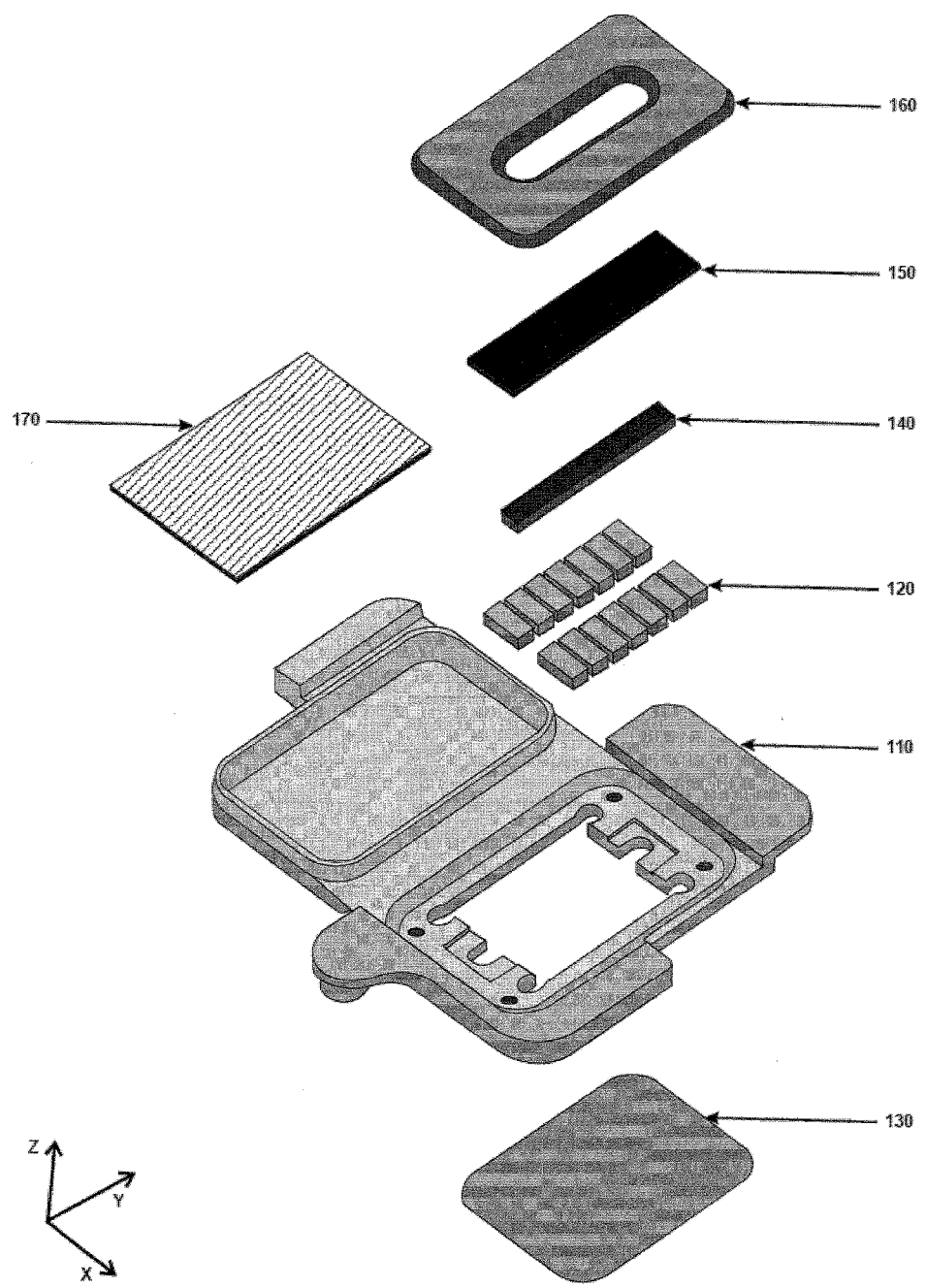
FIG. 1a is a perspective exploded view of a capsule system composed of a housing 110 in which are inserted several nanofluidic biosensors 120. An optical transparent adhesive film 130 is placed under the biosensors 120. The fluidic system is closed with a fluid connecting element 140 acting as fluid transfer system, a filter 150 and a cover 160. An identification module 170 may be inserted in the capsule structure 110.
Figure 1B:
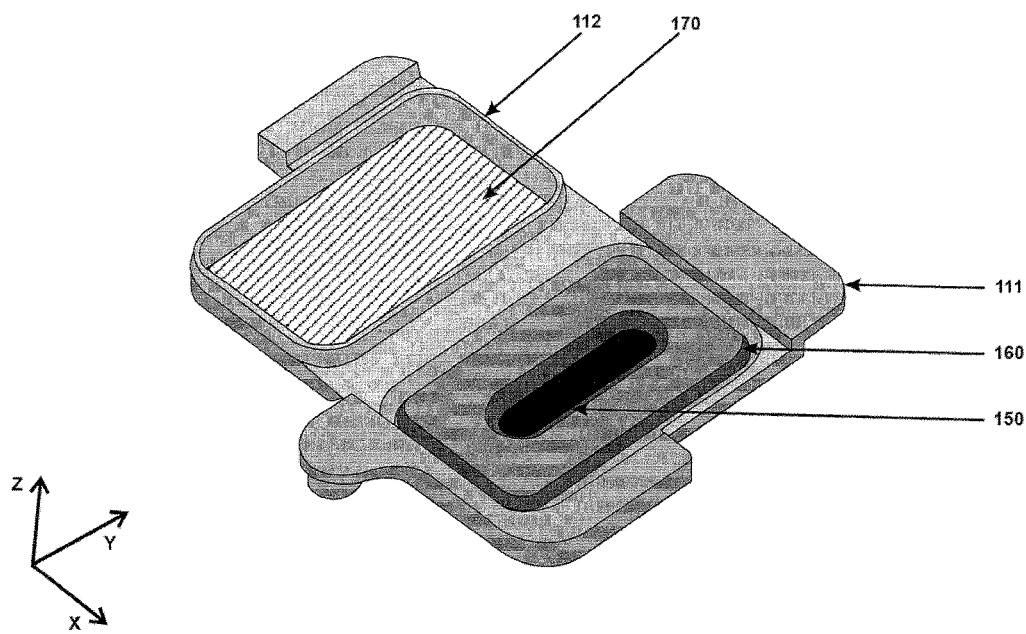
FIG. 1b is a perspective view of the capsule system. The housing 110 is composed of a supporting part 111 that can be inserted on an external support and a closing part 112 that can be folded in order to close the capsule. The cover 160 is containing a main aperture where sample can be deposited directly on the filter 150. An identification subsystem 170 may be inserted in the capsule, for example in the closing part 112.

The present invention aims to simplify the process of collecting, preparing and distributing the fluid samples into the nanofluidic biosensors in order to quantify specific molecular interactions. As shown in FIG. 1a and FIG. 1b, the capsule system described in the present invention is composed of a housing 110, on which is placed one of multiple nanofluidic biosensors 120. An optically transparent adhesive film 130 may be placed at the bottom of the housing 110 if an optical measurement unit will be used for the molecular interaction detection. A fluid connecting element 140 is placed in a way that the inlet or the input aperture of each biosensor 120 is in contact with the fluid connecting element 140. A filter 150 is placed directly on the fluid connecting element 140 in order that the small molecules from the fluid sample pass through the filter 150 are being absorbed and distributed by the fluid connecting element 140. A cover 160 containing one or several apertures, may be added in the capsule system in order to hold in place the biosensors 120, the fluid connecting element 140 and the filter 150. Finally, an identification module 170 can be added in the capsule system, allowing to communicate identification and configuration information to the reader As highlighted in FIG. 1b, the capsule housing may be composed of a supporting part 111 that can be fixed onto an external support and a closing part 112 that can be folded in order to close the capsule.

Figure 2:
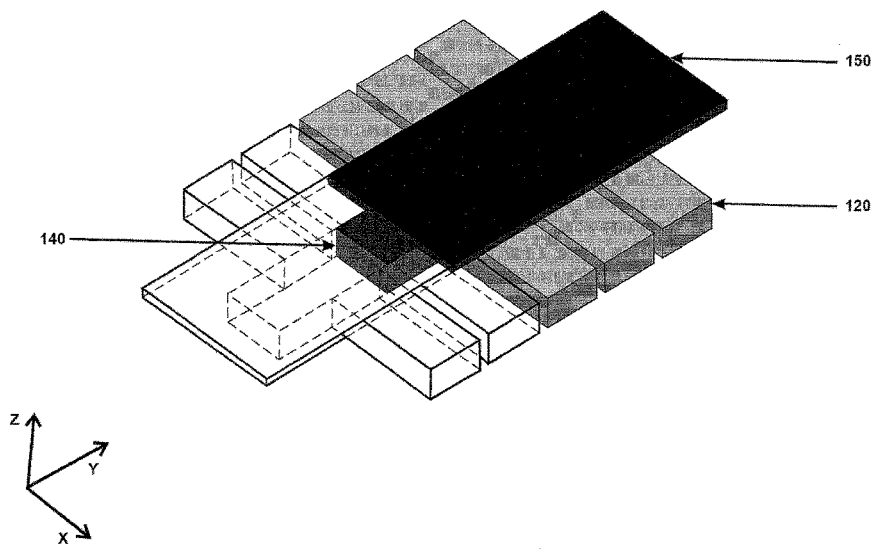
FIG. 2 shows the internal subsystem composed of nanofluidic biosensors 120, the fluid connecting element 140 and the filter 150. Some parts of the drawings are illustrated in dashed line in order to show the hidden components.

FIG. 2 illustrates a perspective view of the inner part of the capsule system, composed of one or several biosensors 120, positioned in a way that their inlet or their input apertures are in contact with the fluid connecting element 140. The said fluid connecting element 140 is positioned in a way that the filter 150 is in contact with the fluid connecting element 140. The dashed elements mean transparency to allow the reader to see elements that would have been hidden.

Figure 3:
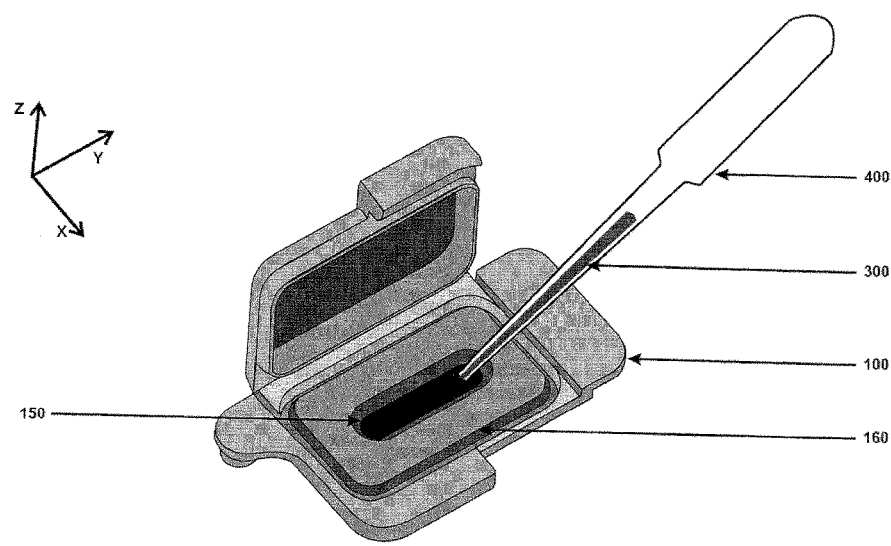
FIG. 3 is illustrating the capsule system 100 that is being filled with fluid sample 300 by means of a pipet system 400. The fluid sample 300 is deposited in the aperture defined in the cover 160, directly on the filter 150.

FIG. 3 illustrates the principle of use of a capsule system 100 comprising a cover 160 having an aperture allowing a pipet 400 to deposit a fluid sample 300 onto the filter 150 directly in the cover 160 aperture. The capsule system 100 may be closed by folding a closing part as depicted in FIG. 4a and FIG. 4b.

Figures 4A, 4B:
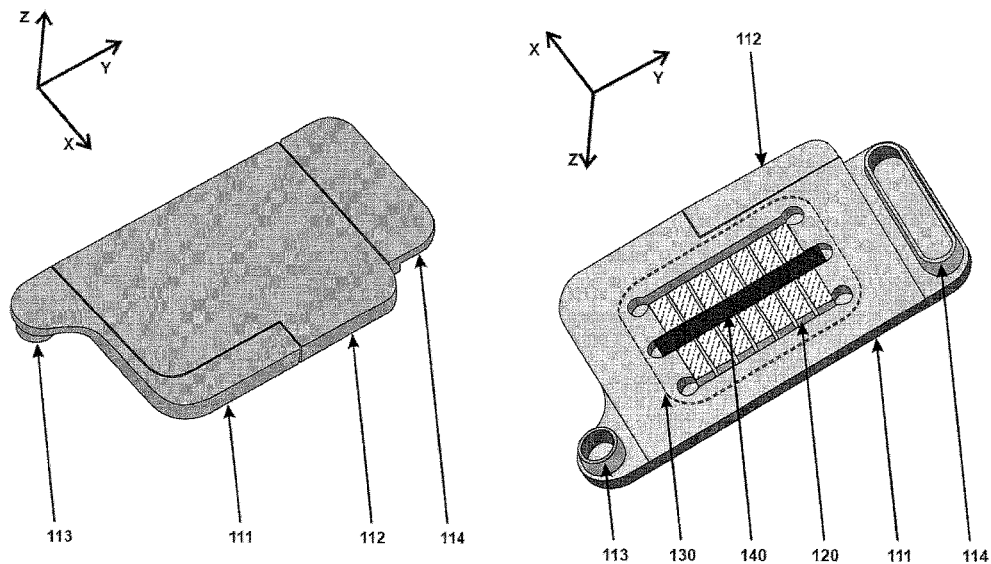
FIG. 4a is a top view of the closed capsule system, meaning that the closing part 112 has been folded onto the supporting part 111. Two subsystems 113 and 114 may be used to fix the capsule to an external support. When subsystems 113 and 114 are designed with different shapes, it prevents against wrong positioning.
FIG. 4b is a bottom view of the closed capsule system, meaning that the closing part 112 has been folded on the supporting part 111. Two subsystems 113 and 114 may be used to fix the capsule to an external support. Nanofluidic biosensors 120 are visible from the bottom side in order to allow the measurement laser beam to access each biosensor through the optically transparent adhesive film 130. The fluid connecting element 140 is also visible from bottom view.

FIG. 4a is a perspective top view of a closed capsule system. As highlighted in FIG. 3, the capsule housing may be closed by folding a closing part 112 on a supporting part 111. One or several subsystems 113 and 114 may be used to fix or to position the capsule system on an external support. When subsystems 113 and 114 are designed with different shapes, it may prevent against wrong positioning.

FIG. 4b is a perspective view from the opposite side (bottom view) of the same closed capsule system, also containing one or several subsystems 113 and 114 that may be used to fix or to position the capsule system on an external support. Nanofluidic biosensors 120 are visible through the optically transparent adhesive film 130 in order to allow the measurement laser beam to access each biosensor. Next to the biosensors, the fluid connecting element 140 is also visible through the optically transparent adhesive film 130.

Figure 5A:
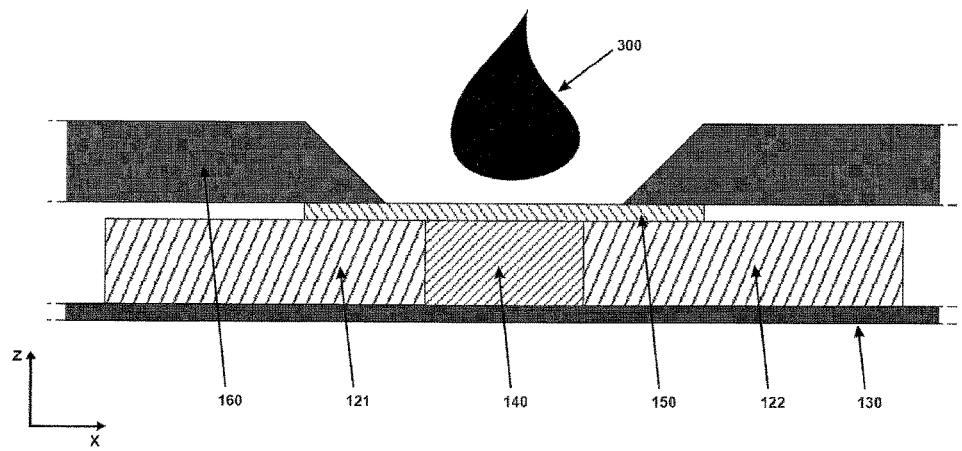
FIG. 5a shows a lateral cross section of the inner part of the capsule system, composed of nanofluidic biosensors 121 and 122, the fluid connecting element 140 and the filter 150, all sandwiched between an optically transparent adhesive film 130 and a cover 160 containing an aperture to let the sample fluid 300 being deposited onto the filter 150. Biosensors 121 represents those located on the left side of the fluid connecting element, and biosensors 122 those located on the right side of the fluid connecting element. All biosensors must be oriented in a way that their input lateral aperture is in contact with the fluid connecting element 150.
Figure 5B:
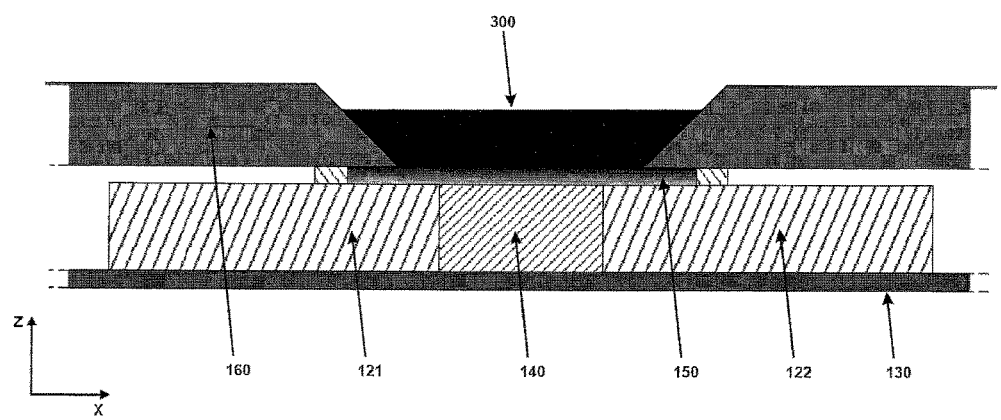
FIG. 5b shows a lateral cross section of the inner part of the capsule system, composed of nanofluidic biosensors 121 and 122, the fluid connecting element 140 and the filter 150, all sandwiched between an optically transparent adhesive film 130 and a cover 160. The sample fluid 300 was previously deposited on the filter 150, which absorbed and distributed it to the fluid connecting element 140, the big components from the fluid sample being filtered by the filter 150.
Figure 5C:
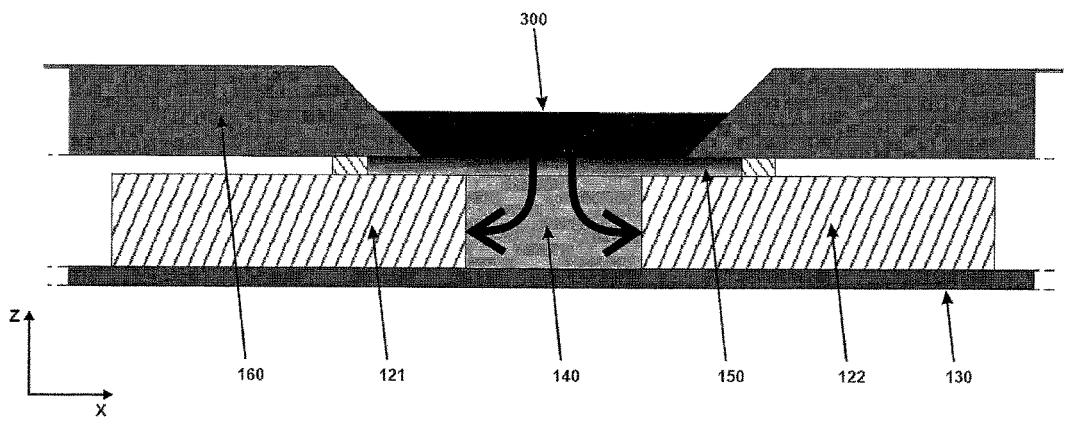
FIG. 5c shows a lateral cross section of the inner part of the capsule system, composed of nanofluidic biosensors 121 and 122, the fluid connecting element 140 and the filter 150, all sandwiched between an optically transparent adhesive film 130 and a cover 160. The sample fluid 300 that was previously deposited on the filter 150, has been absorbed, filtered and distributed to the fluid connecting element 140, which has directed the fluid sample to the lateral apertures of the nanofluidic biosensors (arrows depict typical fluid flow streams).

FIGS. 5a, 5b and 5c illustrate lateral cross sections of the inner capsule system. As described in FIG. 2, the capsule is composed of biosensors 121 and 122 positioned in a way where their inlets or input apertures are in contact with the fluid connecting element 140, which is in contact with the filter 150, all elements sandwiched between the optically transparent adhesive film 130 and the cover 160. The cover 160 is composed of an aperture where the fluid sample 300 can be deposited, directly onto the filter 150. FIG. 5a represents the case just before depositing the fluid sample 300 in the capsule system. FIG. 5b illustrates the case just after the fluid sample 300 deposition, where the filter 150 is mechanically filtering the fluid sample by components size. The big components remain at the surface where the smaller ones are transferred through the filter 150. FIG. 5c presents the case where the fluid sample 300 without the big components that were retained in the filter 150, is driven to the inlet or the input apertures of each biosensors through the fluid connecting element 140.

Figure 6:
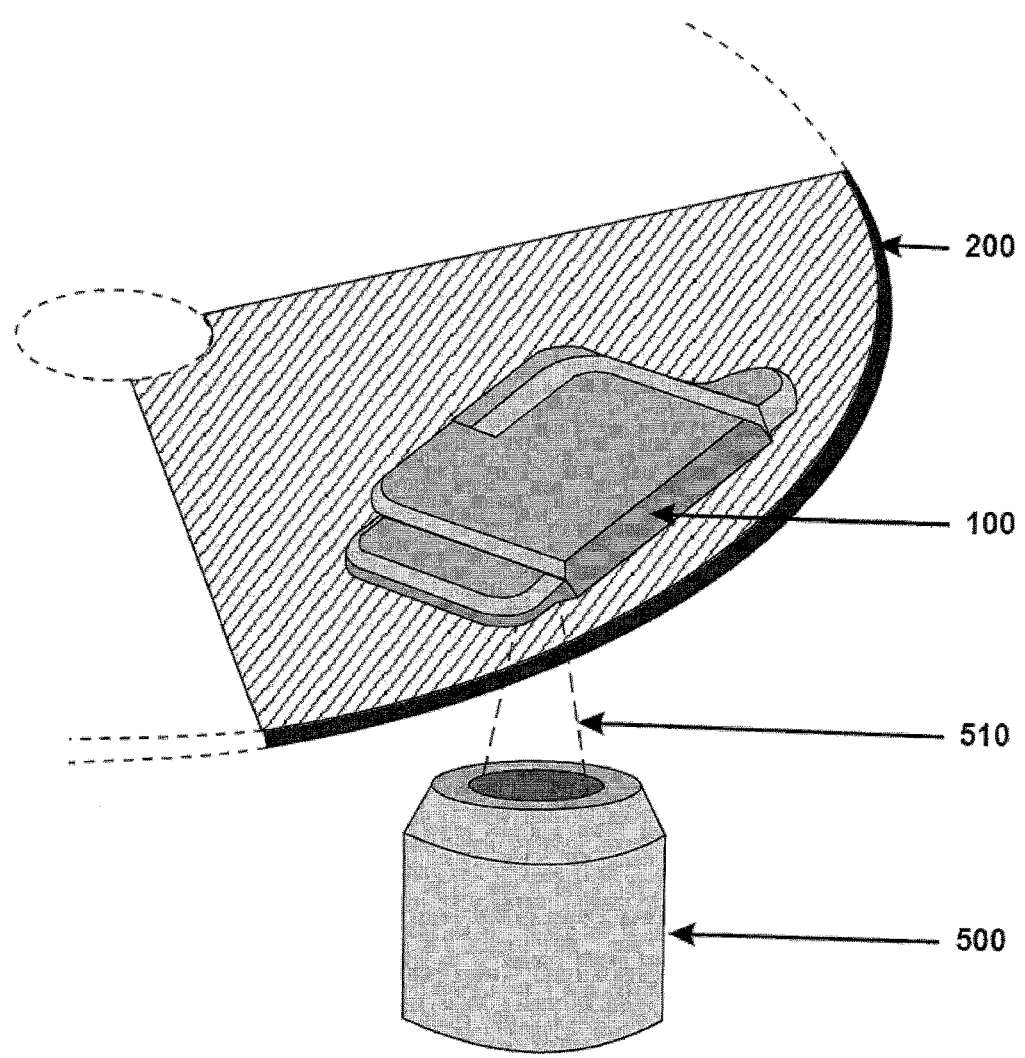
FIG. 6 is a perspective view of a capsule system 100 inserted on an external support 200. An optical measurement unit 500 using a laser beam 510 may be used in order to access the nanofluidic biosensors from the bottom.

FIG. 6 shows a perspective view of a capsule system 100 clipped or placed onto an external support 200 that may be a disc or may have another shape. An optical measurement unit 500 using a laser beam 510 may be used in order to access the nanofluidic biosensors from the bottom. An electrical measurement system may also be used if nanofluidic biosensors are based on an electrical detection technology.

According to the present invention, the capsule system offers great improvements in usability and whole blood filtering for improving the detection, enumeration, identification and characterization of biomolecules interacting or not with other immobilized biomolecules. Applications of the present invention can cover biomedical, biological or food analysis as well as fundamental studies in analytical and bioanalytical chemistry.

The invention claimed is:

1. A capsule for rapid molecular quantification of a fluid sample comprising:
   a cover having an aperture for receiving a fluid sample to be measured;
   a filter having an upper surface that faces the aperture of the cover for receiving the fluid sample;
   a fluid connecting element in contact with a lower surface of the filter acting as a passive fluid transfer system; and
   a plurality of nanofluidic biosensors having input apertures,
   wherein the plurality of nanofluidic biosensors are positioned such that each input aperture of the plurality of nanofluidic biosensors are in contact with the fluid connecting element, the plurality of biosensors arranged at a lateral side of a fluidic pathway formed by the aperture, the filter, and the fluid connecting element.

2. The capsule according to claim 1, wherein the filter is in contact with the fluid connecting element and is dimensioned to retain components of the fluid sample crossing the filter.

3. The capsule according to claim 1, further comprising:
   an identification module arranged on the housing of the capsule.

4. The capsule according to claim 1, wherein the cover comprises several apertures allowing the deposition of the fluid sample in the capsule using a pipet system.

5. The capsule according to claim 1, further comprising:
   a foldable upper part configured to close the capsule.

6. The capsule according to claim 1, further comprising:
   an optically transparent film for maintaining the nanofluidic biosensor inside the capsule without disturbing an optical measurement of the nanofluidic biosensor, the optically transparent film in contact with a lower surface of the plurality of nanofluidic biosensors.

7. The capsule according to claim 1, wherein the filter and the fluid connecting element are made of a porous material.

8. The capsule according to claim 1, wherein the housing has a length, a width and a height between 1 mm and 200 mm.

9. The capsule according to claim 7, wherein the porous material is selected from a group consisting of a fiber agglutination, a micropore structure in silicon, a nanopore structure in silicon, plastic, and glass material.

10. A method for using a capsule for rapid molecular quantification having a plurality of nanofluidic biosensors, the method comprising the steps of:
    depositing a fluid sample through an aperture of the capsule onto an upper surface of a filter that faces the aperture;
    filtering the fluid sample by the filter to extract components;
    allowing the fluid sample to flow through a fluid connecting element of the capsule, the fluid connection element in contact with a lower surface of the filter acting as a passive fluid transfer system, to reach the plurality of nanofluidic biosensors, each input aperture of the plurality of nanofluidic biosensors being in contact with the fluid connecting element; and
    reading a content of the plurality of nanofluidic biosensors,
    wherein the plurality of biosensors are arranged at a lateral side of a fluidic pathway formed by the aperture, the filter, and the fluid connecting element.

11. The method according to claim 10, the capsule further including an optically transparent film for maintaining the nanofluidic biosensor inside the capsule without disturbing an optical measurement of the nanofluidic biosensor, the optically transparent film in contact with a lower surface of the plurality of nanofluidic biosensors, wherein the step of reading further comprises:
    illuminating the plurality of nanofluidic biosensors via the optically transparent film by a measurement unit.

12. The method according to claim 10, further comprising the step of allowing further comprises:
    driving the fluid sample to the input apertures of each biosensors through the fluid connecting element, an upper surface of the fluid connecting element being in contact with the filter, and a side wall of the fluid connection element being in contact with the plurality of nanofluidic biosensors.

13. The capsule according to claim 1, wherein a lateral side wall of the fluid connection element is in contact with the plurality of nanofluidic biosensors, such that the fluid sample is driven to the input apertures of each one of the biosensors through the fluid connecting element.

14. The capsule according to claim 1, wherein the filter has a width such that is covers an upper surface of the fluid connecting element and partially covers an upper surface of the plurality of nanofluidic biosensors.

* * * * *